United States Patent [19]

Engelbrecht et al.

[11] Patent Number: 4,660,286

[45] Date of Patent: Apr. 28, 1987

[54] APPARATUS WITH AUTOMATIC LINE FEEDING

[75] Inventors: Filluppus T. Engelbrecht, Potschefstroom; Frederick D. Potgieter, Pretoria; Cecil R. Smith, Potchefstroom, all of South Africa; Michael A. Helmig, Springtown, Tex.

[73] Assignee: Nylon Line Cutters (Pty.) Ltd., Cape Town, South Africa

[21] Appl. No.: 753,649

[22] Filed: Jul. 10, 1985

[30] Foreign Application Priority Data

Jul. 11, 1984 [ZA] South Africa ............. 84/5330
Feb. 8, 1985 [ZA] South Africa ............. 85/0992

[51] Int. Cl.⁴ .................. B26B 7/00; A01D 46/08
[52] U.S. Cl. .............................. 30/276; 56/12.5
[58] Field of Search .......... 30/276, 347; 56/17.5, 56/12.7

[56] References Cited

U.S. PATENT DOCUMENTS

| 4,104,796 | 8/1978 | Sheldon | 30/276 |
| 4,254,550 | 3/1981 | Satoh | 30/276 |
| 4,285,127 | 8/1981 | Zerrer et al. | 30/276 |
| 4,347,666 | 9/1982 | Moore | 30/276 |
| 4,426,780 | 1/1984 | Foster | 30/347 |
| 4,483,069 | 11/1984 | Moore | 30/276 |

Primary Examiner—Frederick R. Schmidt
Assistant Examiner—Maurina Rachuba
Attorney, Agent, or Firm—James E. Bradley

[57] ABSTRACT

A line trimmer for cutting vegetation has features to enable automatic advancement of line increments while rotating. The trimmer has a housing with an aperture on its periphery. A spool coiled with a flexible cutting line is located in the housing. The free end of the line extends out the aperture into a cutting plane. A set of drive members are located in the housing near the center in a circular array. A drive link is carried in the housing radially outward from the drive members. The drive link will move into contact with the drive members to lock the spool and housing together for rotation. Increased centrifugal force urges the drive link outward, allowing the spool and housing to slip relative to each other to feed out additional line. Stop members are located on the inner side of the housing outer wall. These stop members stop further slippage and force the drive link back into engagement with the drive members.

15 Claims, 9 Drawing Figures

APPARATUS WITH AUTOMATIC LINE FEEDING

BACKGROUND OF THE INVENTION

1. Field of the Invention

This invention relates to the cutting of vegetation, and more particularly to the cutting of vegetation using a flexible, non-metallic cutting line extending from a rotating head and having means for automatically advancing an increment of line as it shortens.

2. Description of the Prior Art

A flexible line trimmer has a rotating head that is driven by an electrical or gasoline motor. The head includes a housing which has an aperture at its periphery. A spool is located in the housing containing a supply of coiled Nylon line. The line extends out the aperture into a cutting plane for trimming the vegetation.

Abrasion on the line during trimming causes the line to shorten fairly rapidly. Also, the line may break. In early versions of these devices, to advance additional line, the motor had to be stopped and the line physically pulled from the spool while disengaging some type of locking mechanism.

In subsequent versions, feeding an increment of line while operating became possible. Generally, these types had a line feeding mechanism in the head. When the operator bumped the head on the ground, drive teeth would disengage and re-engage to feed out an additional increment of line. While successful, it requires the operator to realize when the line is becoming short, which is not often easy. Also, some of the mechanisms tended to stick, and fail to properly feed out the line.

Recently, proposals have been made to automatically feed out an increment of line by using centrifugal force as the line shortens. The speed of the cutting head will automatically increase when the line shortens, thus increasing the centrifugal force. Devices using this principle are shown in U.S. Pat. No. 4,285,127, Zerrer, et al., Aug. 25, 1981, and U.S. Pat. No. 4,347,666, Moore, Sept. 7, 1982.

SUMMARY OF THE INVENTION

The apparatus of this invention is an improved type using centrifugal force increase due to increase in rotational speed for feeding out an increment of line. The apparatus includes a plurality of drive members located in the housing and spaced in a circular array about the axis of rotation. Also included are stop members or means on the housing radially outward from the drive members.

A drive link is carried in the housing between the drive members and stop means. The drive link is urged by a spring inwardly. It is mounted so that it will slide radially outward due to centrifugal force when the housing increases rotational speed a selected amount due to shortening of the free end of the line. As the drive link moves outwardly, it disengages itself from the drive member, allowing slippage of the housing. This slippage results in line being fed out. The drive link will contact the stop means, which stops the slippage and causes the drive link to move back inward.

DESCRIPTION OF THE PREFERRED EMBODIMENT

Figure 1:
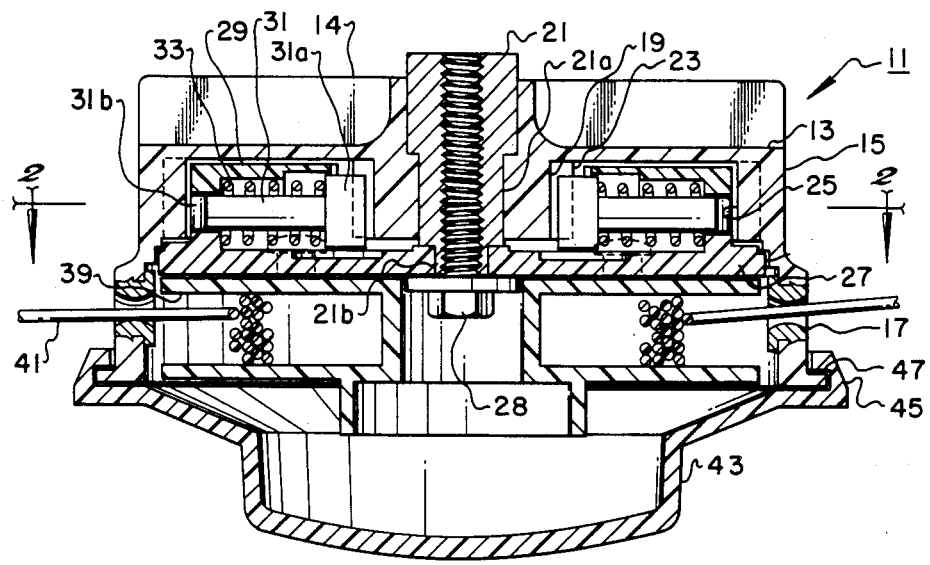
FIG. 1 is a vertical sectional view of a head of an apparatus constructed in accordance with this invention.

Referring to FIG. 1, the apparatus includes a head 11 which is normally supported on the lower end of a handle (not shown). Head 11 includes a housing 13. Housing 13 has cooling fins 14 on its upper surface and an annular depending wall 15. Two apertures 17 are formed in wall 15 and located 180 degrees apart from each other. A hub 19 is inwardly formed in the housing in the center. Hub 19 is a generally cylindrical member having a passage through it for receiving a drive shaft member 21. The drive shaft member 21 has a lower rectangular portion 21b for transmitting rotational motion from an electrical motor or gasoline engine (not shown). A cylindrical portion 21a is located at the center of the drive shaft member 21.

Figure 2:
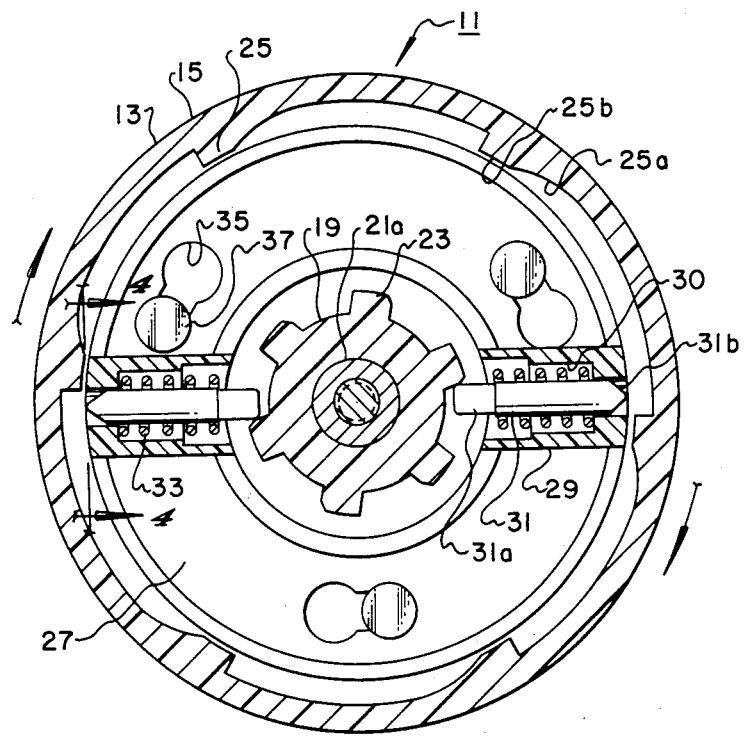
FIG. 2 is a horizontal sectional view of the apparatus of FIG. 1, taken along the line 2—2 of FIG. 1.
Figure 3:
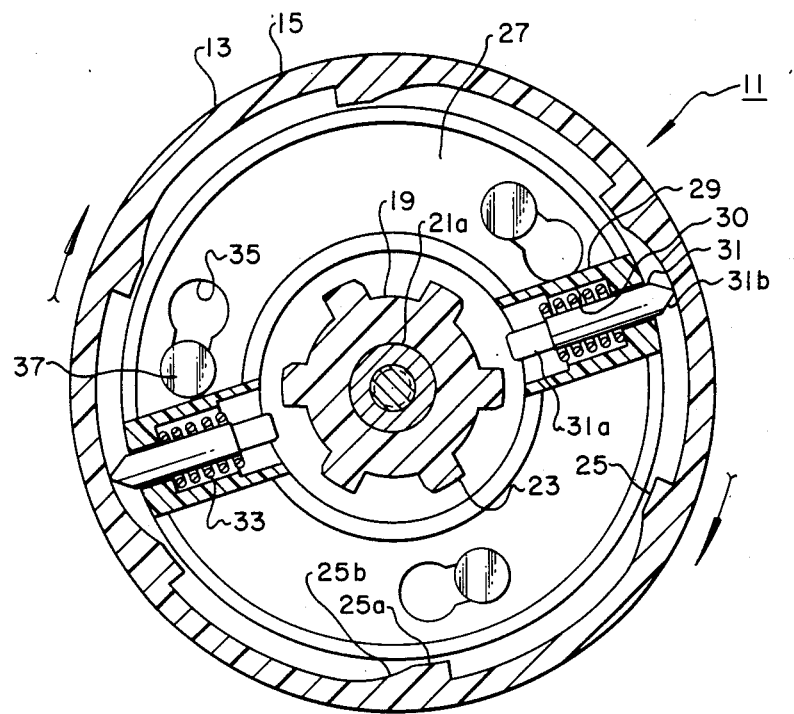
FIG. 3 is a view similar to FIG. 2, but showing the drive links in a disengaged position.
Figure 4:
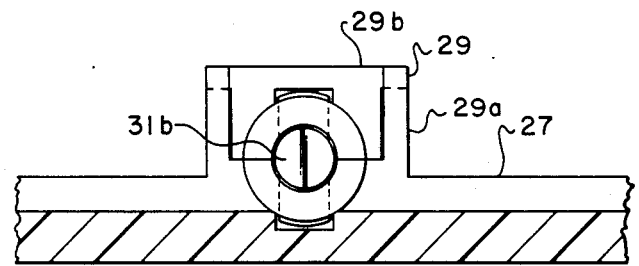
FIG. 4 is a sectional view of the apparatus of FIG. 1, taken along the line 4—4 of FIG. 2.

Referring also to FIGS. 2 and 3 as well as FIG. 1, a plurality of drive member or teeth 23 are formed on the hub 19. Teeth 23 are spaced in a circular array around the axis of rotation of the head 11. Teeth 23 are generally rectangular, and each has a beveled corner on the leading drive surface. A plurality of stop members or means 25 are located on the inner side of the wall 15 of the housing 13. There are the same number of stop members as there are teeth 23. Each stop member has a ramp portion 25a which is a gradually sloping portion that extends inwardly from the inner surface of wall 15. The ramp portion terminates in an inner portion 25b which curves at the same rate as the curvature as the inner surface of the wall 15. The side surface of each stop member 25 opposite the ramp portion 25a is located on a radial line, forming a sharp corner. The ramp portion 25a extends in the same direction as the direction of rotation, as indicated by the arrow.

A rotor or spool driver 27 is carried in the housing 13. Rotor 27 is basically a circular plate that is retained with the drive shaft 21 by means of a bolt 28. Bolt 28 bears against the lower end of the drive shaft member 21, with the center of the rotor 27 being located in the rectangular portion 21b of the drive shaft member 21. Rotor 27 thuis always rotates with drive shaft 21, while housing 13 will slip relative to drive shaft 21 when disengaged as explained subsequently.

Two mounting blocks 29 are formed on the upper surface of the rotor 27. Each mounting block 29 is a two-piece generally rectangular member, having a lower portion 29a integral with rotor 27 and a cap 29b secured thereto. A cavity 30 is located therein. A drive pin or drive link 31 is carried in the cavity along a radial line emanating from the axis of rotation of the head 11. Drive pin 31 has a rectangular head 31a that is adapted to be engaged by the leading surfaces of the teeth 23. The remaining portion is cylindrical, except for the outer end 31b, which has two vertical flat bevels. The beveled end 31b is adapted to contact the stop members 25.

As shown in FIG. 2, each stop member 25 is staggered rotationally a few degrees from each tooth 23. This allows the drive pin 31 to move under increased centrifugal force from the inward drive position shown in FIG. 2 to a disengaging position, as shown in FIG. 3. In the disengaging position, the head portion 31a will not be in contact with any of the teeth 23. The length of the pin 31 is selected so that when in contact with the inner portion 25b of a stop member 25, its head 31a will be pushed back between two of the teeth 23.

A coiled spring 33 encircles the central portion of the drive pin 31, and presses against the head 31a to push drive pin 31 inwardly. The stiffness of spring 33 and the weight of the drive pin 31 are selected so that centrifugal force will overcome the force of spring 33 and force the pin 31 into a disengaged position when the rotational speed has increased to a selected maximum.

In the preferred embodiment, rotor 27 has three holes 35 located in its flat surface for receiving lugs 37 formed on top of a spool 39. The lugs 37 have enlarged heads that fit through an enlarged portion of each slot 35 and slide into a narrow or elongated portion of each slot 35 to releasably retain the spool 39 with the rotor 27. The spool 39 has an annular compartment for receiving a supply of flexible line 41, normally Nylon. Preferably, there is one coil of line 41, with two free end portions, each extending out an aperture 17. The free ends extend into a cutting plane that is perpendicular to the axis of rotation of the head 11. Spool 39 is rigidly locked to the rotor 27 for rotation therewith. Housing 13 is free to slip relative to rotor 27 and spool 39 when the drive pin 31 is out of engagement with the teeth 23.

Referring to FIG. 1, a bottom cover 43 is releasably secured to the bottom of the housing 13, enclosing the spool 39. Cover 43 has a smooth glide ball portion on the lower end. It has a lip 45 on the upper end that has four slots (not shown), each receiving a tab 47 projecting outward on the lower end of the housing 13. The cover 43 is twisted relative to housing 13 once the tabs 47 are in the slots, to releasably lock the cover 43 to the housing 13.

In operation, the power source (not shown) rotates the drive shaft member 21, which in turn rotates the rotor 27 and spool 39. The teeth 23 on the hub 19 transmit the rotational force through the drive pins 31 to the housing 13. This causes the spool 39 to rotate in unison with the housing 11. The line 41 will be extending out each aperture 17, forming a cutting plane for trimming the vegetation.

As the line 41 shortens, the rotational speed of the head 11 will increase. The higher rotational speed applies additional centrifugal force on the drive pins 31. At the maximum selected rotational speed and minimum selected cutting line 41 length, the centrifugal force will overcome the force of the springs 33, moving both drive pins 31 outwardly. As the head portions 31a clear the teeth 23, housing 13 will be disengaged from the rotational force of the drive shaft member 21. The rotor 27 will continue to rotate, but the housing 13 will slip rotationally relative to the rotor 27 and spool 39.

This causes line 41 to uncoil, feeding out an additional increment of line.

Once the drive pins 31 are disengaged from the drive teeth 23, they will move out and contact the inner surface of the housing wall 15. The slippage of housing 13 with respect to the rotor 27 causes the pin ends 31b to slide along the inner surface of wall 15 into contact with the ramps 25a. The ramps 25a push the drive pins 31b back inwardly. Once the end portion 31b has reached the inner surface 25b of the stop members 25, the head 31a will be back located between two of the teeth 23. Also, the additional line fed out will have slowed the rotational speed down such that the spring 33 will overcome the centrifugal force. The head 31a will contact with one of the drive teeth 23, engaging the spool 39 with the housing 13. When the line again shortens, the cycle is repeated.

The invention has significant advantages. Line is fed out automatically when it shortens, avoiding the need for the operator to detect when the line is too short. The stop members, with the ramp portions, assures that only a predetermined increment of line will be fed out each time.

Another embodiment of a trimmer having an automatic line feeding means is shown in FIGS. 5–8. The trimmer has a head 49, which includes a housing 51. Housing 51 has an aperture 53 and a depending wall. Line (not shown) extends through the aperture 53. A hub 55 is integrally formed in the housing 51 for rotation therewith. Rectangular drive member 57 inserts through a hole in the hub for driving the housing 51.

Figure 6:
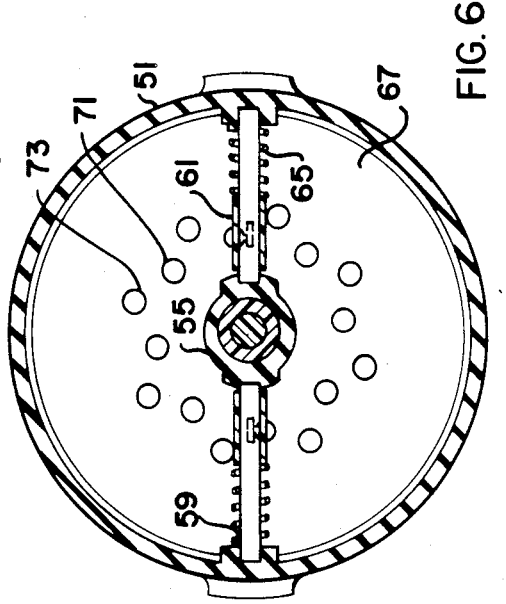
FIG. 6 is a horizontal sectional view of the apparatus of FIG. 5, taken along the line 6—6 of FIG. 5.

A pair of rods 59 extends between hub 55 and the inside surface of the wall of housing 51. Each rod 59 is located on a radial line, and is 180 degrees from the opposite rod, as shown in FIG. 6. A drive link 61 is slidably carried on each rod 59. Drive link 61 is a sleeve that closely recieves the rod 59. Each drive link 61 has a depending pawl or detent 63. A coiled spring 65 urges each drive link 61 inwardly.

A spool 67 is carried in the housing 51 by means of a bolt 69 which screws into the drive member 57. Spool 67 is able to rotate selectively with respect to the housing 51. Spool 67 has on its upper surface a plurality of drive posts 71. Each drive post 71 is a cylindrical member extending upwardly a short distance and located in a circular array concentric with the axis of the head 49. The detent 63 extends almost to the upper surface of the spool 67 and is positioned to engage the drive post 71 during normal rotation.

There are also a plurality of stop posts 73, as shown in FIG. 6. The stop posts 73 are also cylindrical and located in a circular array concentric with the axis of the head 49. Stop posts 73, however, are located radially farther outward than the drive posts 71. Also, stop posts 73 are staggered rotationally, with a stop post 73 alternating with each drive post 71. The stop posts 73, during normal rotation, will not be in contact with the detent 63. When the drive link 61 moves outwardly, however, the detent 63 will contact one of the stop posts 73. A bottom cover 75 is secured to the lower side of the housing 51.

Figure 5:
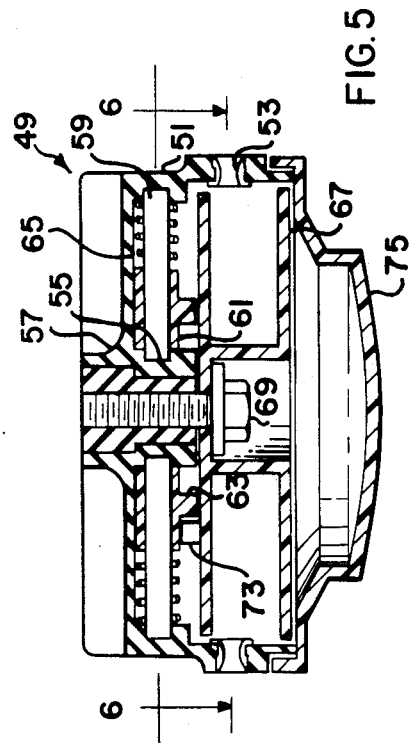
FIG. 5 is a vertical sectional view of a second embodiment of a head constructed in accordance with this invention.

In the operation of the embodiments in FIGS. 5–8, as shown in FIGS. 5 and 6, during normal operation, the drive force by the drive member 57 is transmitted through the rod 59 to the drive link detent 63, through one of the drive posts 71, thus causing the spool 67 to rotate in unison with housing 51.

Figure 7:
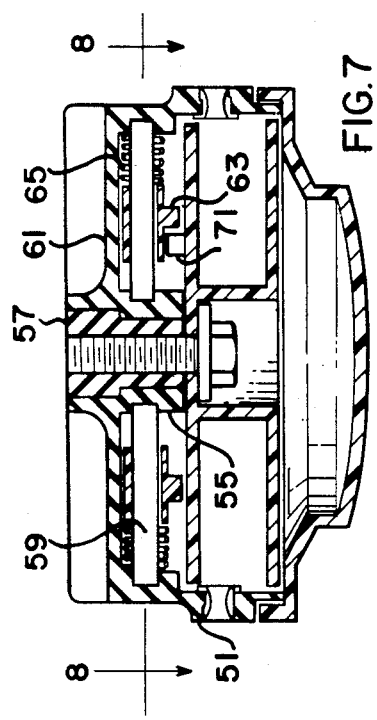
FIG. 7 is a vertical sectional view of the apparatus of FIG. 5, shown in a line feeding position.
Figure 8:
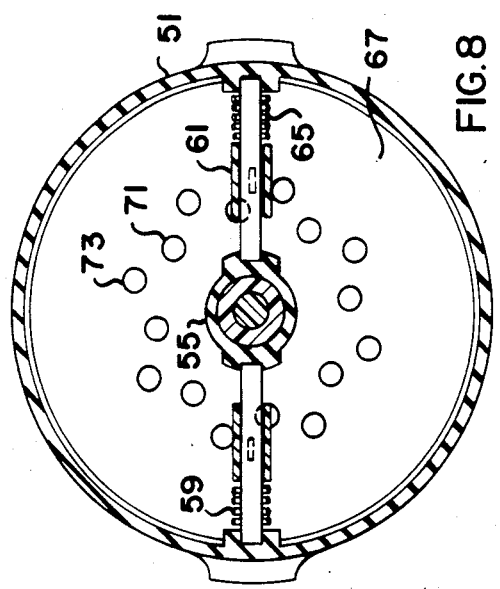
FIG. 8 is a horizontal sectional view of the apparatus of FIG. 7, taken along the line 8—8 of FIG. 7.

If the line shortens a selected amount, the rotational speed will increase, causing the drive links 63 to move outwardly, overcoming the force of the spring 65. When drive links 61 move outwardly, slippage of the spool 67 relative to the housing 51 occurs, feeding out additional line until the detent 63 contacts the next stop post 73. The additional line fed out will slow the motor speed sufficiently such that the spring 65 will urge the drive link 61 back inward. The detent 63 will move away from the stop post 73, feeding out more line until it contacts the next drive post 71. Spool 67 again slips relative to the housing 51 as the drive link 61 moves from engagement with the stop post 73 to the drive post 71. Spool 67 will then again rotate in unison with the housing 51. FIGS. 7 and 8 show the position of the drive link 61 while it is engaging the stop post 73.

Figure 9:
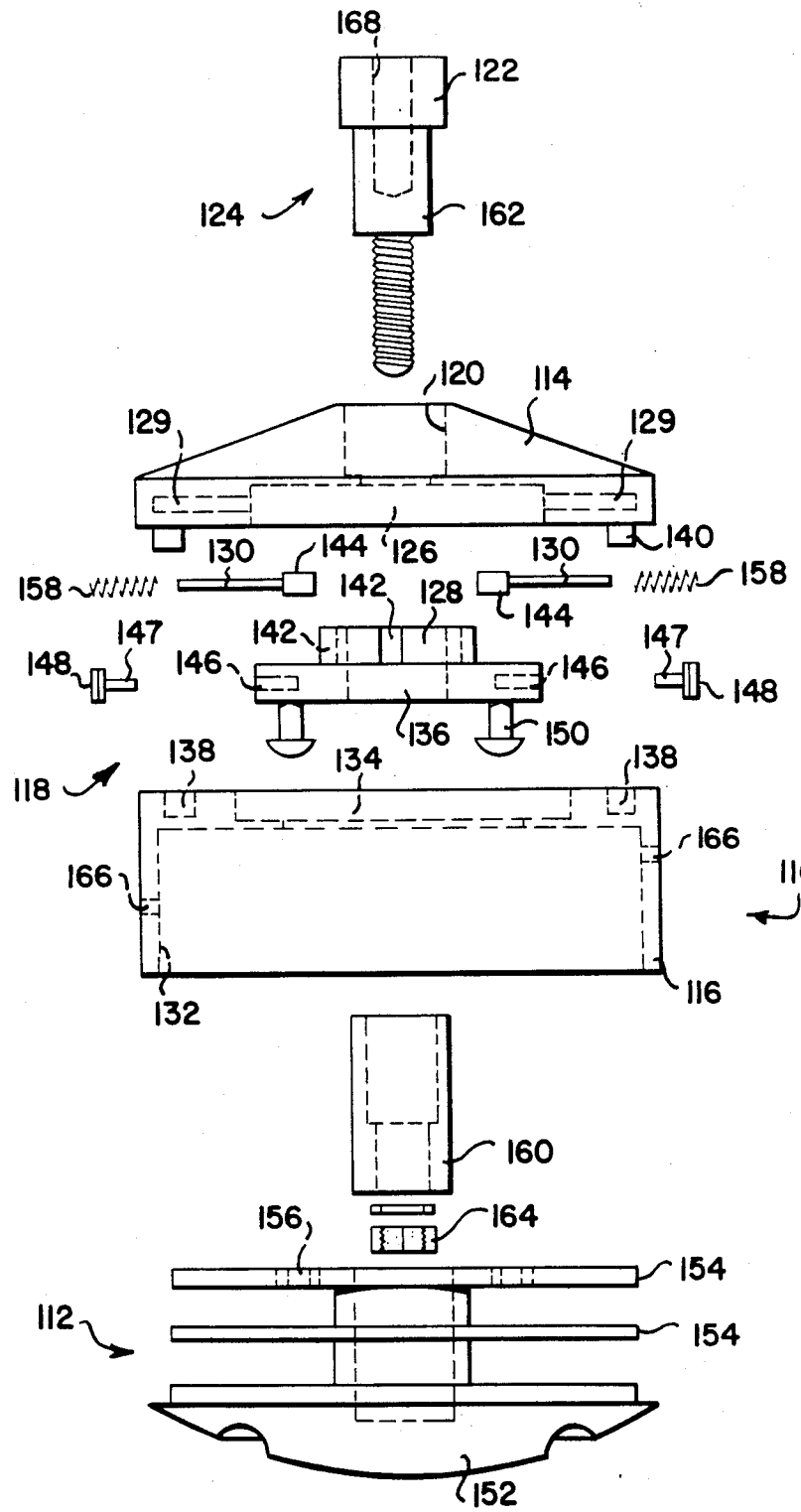
FIG. 9 is an exploded side view of a third embodiment of a head constructed in accordance with this invention.

Another alternative embodiment is shown in FIG. 9. The trimmer in FIG. 9 consists principally of a housing which is indicated generally at 110 and a cord spool element 112.

The housing 110 includes an upper closure 114, a cylindrical body 116 and a brake arrangement 118. The closure 114 includes a square axially located bore 120 for receiving the squared head 122 of a connecting bolt 124, a recess 126 for a lock portion 128 of the brake arrangement 118 and two diametrically opposite bores 129 which extend radially outwardly from the recess 126 for locating the shafts of locking pins 130. The housing body 116 includes a cavity 132 in which the spool element 112 is located in use, a recess 134 in which the brake portion 136 of the arrangement 118 is located and two recesses 138 in which key formations 140 on the closure 114 are located to prevent relative rotation of the closure relatively to the body portion of the housing.

The lock and brake portions of the brake arrangement are made integral with the lock portion 128 including four radially directed recesses 142 for receiving heads 144 on the locking pins 130, and the brake portion 136 including two radial bores 146 in which shafts 147 on arcuate brake shoes 148 are freely slidable. The brake arrangement additionally carries two downwardly depending studs 150 which, when the housing 110 is assembled, project from the recess 134 into the spool cavity 132.

The spool element 112 includes a domed base 152, a central hub and two spool flanges 154. The upper flange 154 carries two arcuate slots 156 which have enlarged opposite ends through which the heads on the brake arrangement studs 150 may pass. The element 112 is preferably made from a hard wearing plastics material such as nylon.

To assemble the trimmer, springs 158 are located over the stems of the locking pins 130 and the stems of the pins are located in the bores 129 in the closure member. The bolt 124 is located in the bore 120 of the closure. A sleeve 160 is located over the stem 162 of the bolt and the brake arrangements 118 is located on the sleeve with its lock portion 128 located in the closure recess 126. To enable this to be done it will be necessary to press the locking pins radially outwardly against the bias of their springs so that when released and aligned with two opposite recesses 142 the heads of the pins will be biased by their springs into the recesses to prevent relative rotation of the brake arrangement relatively to the closure and body of the housing.

The shafts 147 on the brake shoes 148 are slidably located in the bores 146 on the brake portion of the brake arrangement 118, and the recess 134 in the body portion 116 of the housing is located over the brake portion 136 of the arrangement 118. With the keys 140 on the closure located in the recesses 138, the body 116 is fixed to the closure 114 by any suitable fasteners. A nut 164 is engaged with the threaded end of the bolt 124 to hold the assembled housing components together.

A length of suitable nylon cord is wound onto each of the spools of the spool element 112. The free ends of the cords are passed through two holes 166 in the skirt of the housing body 116 to extend from the housing by the desired length. The edges of the spool flanges 154 carry grooves in which the cords are located to enable the spool element to be pressed into the housing over the sleeve 160.

The heads of the studs 150 are located in the enlarged ends of the slots 156 in the upper spool flange and the spool element is rotated so that the shafts of the studs are located in the slots with the stud heads trapping the spool against withdrawal from the housing in an axial direction. The locking direction of rotation of the spool is naturally opposite to the direction of rotation of the trimmer in use. The bolt 124 carries a threaded bore 168 which, in use, is engaged with the remote end of a drive shaft or cable from a hand held motor.

In operation, as the trimmer is spun by the motor, the trimmer will reach a speed below its operating speed at which the centrifugal force acting on the brakes shoes is such that the shoes will be thrown outwardly frictionally to engage the peripheral wall of the recess 134. When the trimmer is rotating at operational speed with correct projecting cord length and brake shoes are braked against the recess sidewall and the pins 130 are biased into the recesses 142 in the brake arrangement.

If one or both of the projecting cutting cords are snapped or become shorter through wear, the load on the motor will decrease and the rotational speed of the trimmer will increase. The tension of the springs 158 is so selected that this increase in speed will cause the centrifugal force acting on the pins 130 to overcome the spring bias to allow the heads of the pins to clear the recesses 142 and unlock the brake arrangement and spool element from the housing. If the brake shoes were not holding the two components against relative rotation, the centrifugal force acting on the cords would merely pull all of the cord wound onto the spools of the spool element from the housing. The mass of the brake shoes is, however, so selected that when the spool element becomes unlocked from the housing, the brake arrangement and spool will rotate slowly against the brake force relatively to the housing until sufficient cord is pulled centrifugally from the housing. The increased cord length again slows the motor to its operating speed at which the bias of the springs will overcome the centrifugal force acting on the pins 130 to relocate the pin heads in the recesses 142 as the recesses are rotated slowly past the pins.

While the invention has been shown in only one of its forms, it should be apparent to those skilled in the art that it is not so limited but is susceptible to various changes without departing from the scope of the invention.

We claim:

1. In an apparatus of the type having a head, means for rotating the head about an axis of rotation, the head including a housing having a depending outer wall with an aperture formed thereon, a spool carried in the housing with a supply of flexible line coiled on the spool and having a free end extending from the aperture into a plane, means for feeding increments of the line into the plane during rotation of the housing, comprising in combination:

a plurality of drive members located in the housing and spaced in a circular array about the axis of rotation;

at least one drive link carried in the housing radially outward from the drive members;

spring means for urging the drive link inwardly into engagement with the drive members during normal speed operation;

mounting means for mounting the drive link for radial sliding movement by increased centrifugal force due to above normal speed operation outwardly from a drive position engaging one of the drive members and interconnecting the spool and the housing for rotation in unison, to a disengaged position allowing slippage of the housing and spool relative to each other to advance additional line; and stop means on the housing wall radially outward from the drive members for sliding engagement with the drive link while in the disengaged position, the stop means having a cam surface protruding inwardly from the wall for forcing the drive link to move back to the drive position.

2. The apparatus according to claim 1 wherein each cam surface has a ramp portion that curves inwardly from the wall for moving the drive link back inwardly as the housing and spool slip relative to each other.

3. In an apparatus of the type having a head, means for rotating the head about an axis of rotation, the head including a housing having a depending wall with an aperture formed therein, a spool carried in the housing with a supply of flexible line coiled on the spool and having a free end extending from the aperture into a plane, means for feeding increments of the line into the plane during rotation of the housing, comprising in combination;

a hub located in the housing for movement therewith;

a rotatably driven drive shaft extending through the hub, the drive shaft being rotatable with respect to the hub and housing, the spool being rigidly connected to the drive shaft for rotation therewith;

a plurality of drive members located on the hub and spaced in a circular array about the axis of rotation;

a plurality of stop members located on an inner surface of the wall of the housing, radially outward and rotationally staggered from the drive members;

at least one drive link carried by the spool for rotation therewith, the drive link being radially movable due to increased centrifugal force between a drive position in contact with one of the drive members to lock the hub to the spool and drive shaft for rotation in unison, to a disengaged position allowing the housing to slip relative to the spool and drive shaft to feed out additional line, the drive link being movable into contact with one of the stop members in the disengaged position; and spring means for urging the drive link inwardly for maintaining the drive link in contact with one of the drive members during normal speed operation, for allowing the drive link to move outwardly during above normal speed operation into contact with one of the stop members, and for moving the drive link back inwardly from the stop member into contact with one of the drive members as the speed slows again to normal.

4. The apparatus according to claim 3 wherein each stop member has a ramp portion that curves inwardly from the inner surface of the wall for moving the drive link back inwardly as the housing slips relative to each other.

5. The apparatus according to claim 3 wherein the drive link is a pin.

6. An apparatus, comprising in combination:

a housing having a wall at its periphery and a hub portion in its center, the wall having an aperture;

a plurality of drive members formed on the hub and spaced in a circular array about the axis of rotation;

a plurality of stop members formed on an inner surface of the wall, each stop member being staggered rotationally from each drive member, each stop member having a ramp portion curving inwardly from the wall;

a rotor carried in the housing around the hub;

drive means extending through the hub and rigidly connected to the rotor for rotating the rotor, the hub and housing being rotatable relative to the drive means;

a drive link radially mounted to the upper surface of the rotor and movable due to increased centrifugal force from a drive position in contact with one of the drive members, locking the hub and rotor together, to a disengaged position outwardly out of engagement with the drive members into contact with one of the stop members, the ramp of which urges the drive link back into engagement with one of the drive members;

spring means for urging each drive link inwardly for maintaining the drive link in contact with one of the drive members during normal speed operation; and a spool rigidly mounted to the bottom of the rotor in the housing, the spool having a supply of flexible line coiled thereon and a free end extending from the aperture into a plane;

the radial outward movement of the drive link causing slippage of the housing relative to the drive means and spool to feed out an increment of line.

7. The apparatus according to claim 6 wherein the drive link is a pin having a beveled portion on its outer end, and the spring means comprises a coiled spring encircling each pin.

8. The apparatus according to claim 6 wherein the rotor and spool having mating surfaces and are connected together by a plurality of lugs extending from one of the surfaces into slots formed in the other surface.

9. In an apparatus of the type having a head, means for rotating the head about an axis of rotation, the head including a housing having an aperture formed on its periphery, a spool carried in the housing with a supply of flexible line coiled on the spool and having a free end extending from the aperture into a plane, means for feeding increments of the line into the plane during rotation of the housing, comprising in combination:

a plurality of drive members located in the housing and spaced in a crcular aray about the axis of rotation;

at least one drive link carried in the housing radially outward from the drive members;

mounting means for mounting the drive link for radial sliding movement between a drive position engaging one of the drive members and interconnecting the spool and the housing for rotation in unison, to a disengaged position allowing slippage of the housing and spool relative to each other to advance additional line, the drive link moving outwardly to the drive position as a result of increased centrifugal force due to increased speed that occurs as the line shortens; and stop means for engaging the housing while the drive link is in the disengaged position to control the slippage between the housing and the spool, until sufficient line has been advanced, at which time the increased line length reduces the rotational speed, and the drive link moves back to the engaged position; and spring means for urging the drive link inwardly for maintaining the drive link in contact with one of the drive members during normal speed operation, for allowing the drive link to move outwardly during above normal speed operation into contact with the stop means, and for moving the drive link back inwardly into contact with one of the drive members as the speed slows again to normal.

10. The apparatus according to claim 9 wherein the stop means comprises at least one brake shoe carried in the housing on the drive link for radial sliding movement therewith, the brake shoe engaging a wall of the housing to apply a frictional force to control slippage of the spool and housing relative to each other.

11. The apparatus according to claim 9 wherein the drive link has a detent located thereon, which engages the drive members while in the engaged position, and wherein the stop means comprises a plurality of posts spaced outwardly and staggered rotationally from the drive members for contact with the detent while the drive link is in the disengaged position.

12. In an apparatus of the type having a head, means for rotating the head about an axis of rotation, the head including a housing having an aperture formed on its periphery, a spool carried in the housing with a supply of flexible line coiled on the spool and having a free end extending from the aperture into a plane, means for feeding increments of the line into the plane during rotation of the housing, comprising in combination:

a plurality of drive members located in the housing and spaced in a circular array about the axis of rotation;

at least one drive link carried in the housing radially outward from the drive members;

spring means for urging the drive link inwardly into engagement with one of the drive members;

mounting means for mounting the drive link for radial sliding movement by increased centrifugal force outwardly from a drive position engaging one of the drive members and interconnecting the spool and the housing for rotation in unison, to a disengaged position allowing slippage of the housing and spool relative to each other to advance additional line; and at least one brake shoe carried in the housing for radial sliding movement, the brake shoe engaging a wall of the housing to apply a frictional force to control slippage of the spool and housing relative to each other.

13. In an apparatus of the type having a head, drive means for rotating the head about an axis of rotation, the head including a housing having a depending wall with an aperture formed therein, a spool carried in the housing with a supply of flexible line coiled on the spool and having a free end extending from the aperture into a plane, means for feeding increments of the cutting line into the plane during rotation of the housing, comprising in combination;

a hub located in the housing for movement therewith;

mounting means for mounting the spool to the hub for movement therewith;

a plurality of drive members located on the hub and spaced in a circular array about the axis of rotation;

at least one drive link carried by the housing for rotation therewith, the drive link being radially movable due to increased centrifugal force between a drive position in contact with one of the drive members to lock the housing and the spool together for rotation in unison, to a disengaged position allowing the housing and spool to slip relative to each other to feed out additional line;

spring means for urging the drive link inwardly; and at least one brake shoe carried by the drive link therewith, the brake shoe being radially movable to a position frictionally engaging a wall in the housing to slow slippage of the spool and housing relative to each other while the drive link is in the disengaged position.

14. In an apparatus of the type having a head, drive means for rotating the head about an axis of rotation, the head including a housing having a depending wall with an aperture formed therein, a spool carried in the housing with a supply of flexible line coiled on the spool and having a free end extending from the aperture into a plane, means for feeding increments of the cutting line into the plane during rotation of the housing, comprising in combination;

a hub located in the housing for movement therewith;

a plurality of drive members located on the upper surface of the spool and spaced in a circular array about the axis of rotation;

a plurality of stop members located on the upper surface of the spool radially outward and rotationally staggered from the drive members;

at least one drive link slidably carried by the hub for rotation therewith, the drive link having a depending detent positioned for engaging the drive and stop members;

the drive link being radially movable due to increased centrifugal force between a drive position in contact with one of the drive members to lock the spool and the housing together for rotation in unison, to a disengaged position allowing the housing and spool to slip relative to each other to feed out additional line, until contacting one of the stop members;

spring means for urging the drive link inwardly for maintaining the drive link in contact with one of the drive members during normal speed operation, for allowing the drive link to move outwardly during above normal speed operation into contact with one of the stop members, and for moving the drive link back inwardly from the stop member into contact with one of the drive members as the speed slows again to normal.

15. The apparatus according to claim 14 wherein a rod is radially mounted between the hub and the housing wall, and wherein the drive link comprises a sleeve reciprocally carried on the rod.

* * * * *